United States Patent [19]

Butulis

[11] 3,906,203

[45] Sept. 16, 1975

[54] DATA RETRIEVAL AND ERROR DETECTION CIRCUITRY FOR A WIDTH-MODULATED BAR-CODE SCANNING APPARATUS

[75] Inventor: Arnis G. Butulis, Dayton, Ohio

[73] Assignee: Monarch Marking Systems, Inc., Dayton, Ohio

[22] Filed: Sept. 20, 1973

[21] Appl. No.: 399,773

[52] U.S. Cl. .......................... 235/61.11 E; 250/566

[51] Int. Cl.$^2$ ....................... G06K 7/10; G08C 9/06

[58] Field of Search ............. 235/61.11 E, 61.11 D; 340/146.3 K, 146.3 F; 250/555, 566

[56] References Cited

UNITED STATES PATENTS

| | | | |
|---|---|---|---|
| 3,701,097 | 10/1972 | Wolff | 340/146.3 Z |
| 3,737,632 | 6/1973 | Barnes | 235/61.11 E |
| 3,752,963 | 8/1973 | Herrin | 235/61.11 E |
| 3,783,244 | 1/1974 | Kapsanibelis | 235/61.11 E |
| 3,784,792 | 1/1974 | Dobras | 235/61.11 E |

*Primary Examiner*—Daryl W. Cook
*Attorney, Agent, or Firm*—Mason, Kolehmainen, Rathburn & Wyss

[57] ABSTRACT

An apparatus for processing the signals that are generated when a width-modulated bar code is manually scanned includes a simplified serial arithmetic unit and an error-detection circuit which detects errors in scanning technique as well as parity errors and the like. Substantially less expensive to construct than prior arrangements, the apparatus is able to measure the spacing between adjacent bar-coded characters and reject any data if the character spacing is greater or less than is proper at any given point in a data scan. It thus becomes difficult for an erroneous scan to result when a scanning motion reverses itself, begins in the middle of a bar code, or extends over two independent bar codes.

14 Claims, 6 Drawing Figures

DATA RETRIEVAL AND ERROR DETECTION CIRCUITRY FOR A WIDTH-MODULATED BAR-CODE SCANNING APPARATUS

BACKGROUND OF THE INVENTION

The present invention relates primarily to the manual scanning of width-modulated bar codes and, more particularly, to the design of simplified logic circuitry for processing the signals generated by such scanning and for greatly minimizing the chance of gathering improper data during the scanning process.

The present invention is an improvement on the apparatus disclosed in U.S. Pat. No. RE. 28,198 which issued on Oct. 15, 1974 and which was originally filed by Bruce W. Dobras as application Ser. No. 239,168 on Mar. 29, 1972. That application is assigned to the same assignee as the present application. The apparatus described in the Dobras application is one which may be used to scan width-modulated bar codes. Briefly described, the Dobras apparatus includes an optical bar-code scanning stylus which is designed to be drawn manually over a record or ticket bearing a width-modulated bar code. The apparatus includes a bar-width decoding logic that is constructed from five counters, two adders, and a fairly complex array of gates and steering logic all of which appear generally in FIG. 1 of the above-mentioned patent. One primary object of the present invention is to provide a simplified form of decoding logic which is comparable in its capabilities to the logic used by Dobras. In particular, the present invention is able to perform the same basic functions as the above logic, yet it basically includes only a single counter, two shift registers and four serial adders.

The Dobras apparatus described in the abovementioned patent includes error-checking circuitry which signals when an improper character is scanned and when the speed of scanning is either too slow or too fast. These basic error checks are sufficient to prevent the collection of most erroneous data. However, they are frequently unable to catch a number of infrequently-encountered errors which nonetheless can reduce the reliability of the data scanning process. Another object of the invention is therefore to design a bar code scanning system that is able to detect almost all scanning errors, even those which are infrequently encountered, and which is able to insure almost 100 percent accuracy in the data collection process in every case. A further object of the invention is to achieve this ability to detect scanning errors in a simple apparatus which may be produced at a low cost per unit.

BRIEF SUMMARY OF THE INVENTION

Briefly described, the present invention comprises a bar code scanning system which includes a simplified logic subsystem for comparing the relative width of the bars and spaces that are scanned and which also includes provision for rejecting erroneous data. To a greater extent than any prior arrangement known to applicant, the system is so immune to errors that it cannot be misused by untrained personnel, such as those who are frequently hired to serve as check-out clerks in retail stores. The system refuses to scan most records which have been altered either inadvertantly or intentionally, and it refuses to collect data when scanning motions occur which are attempts to alter the price data associated with a given peice of merchandise.

The system utilizes a conventional bar-code scanning stylus and a conventional analog input circuit. A single counter within the system counts uniformly-spaced clock pulses during the time required to scan each successive bar and space code element. A number is generated by this counter each time a bar or space code element is scanned, and this number is proportional to the time that it takes to scan the element. This series of numbers is transferred one-at-a-time into a shift register.

The shift register has at least four outputs from adjacent shift register stages. Each time the shift register is loaded with a number, the number which it contains is immediately fed serially forward and appears at the four outputs in serial form. For reasons explained more fully at a later point, the first output presents the number itself, the second output presents the number multiplied by two, the third output presents the number multiplied by four, and the fourth output presents the number multiplied by eight. Serial adders add together the first and second outputs to present the number multiplied by three, and also the first and third outputs to present the number multiplied by five. The number multiplied by five is fed into a shift register and is stored for comparison to a later-generated number multiplied by three and by eight, as is explained in the next paragraph.

A pair of simple comparators which may be serial arithmetic units are then used to compare the stored times five number presented by the shift register to the nondelayed times three and times eight values presented by the serial adders. The comparators are able to accurately determine whether the stored number is much larger than, about the same size as, or much smaller than the other number, and thus whether the most recently scanned bar or space element is wider than, narrower than, or about the same width as the previously scanned element. The comparison results for a number of comparisons are then used to address a read only memory and to initiate the retrieval from the memory of data corresponding to the data content of a series of bars and spaces.

The use of a read-only memory to convert comparison results into output data is not new per se and is shown, for example, in FIG. 7 of the Dobras patent cited above. One facet of the present invention, however, is the act of separately converting the results of bar-width comparisons and the results of space-width comparisons for each individual multi-element character. Separate conversion may be carried out with a much smaller read-only memory than is required when all elements of a character are decoded as a unit. The separately-decoded output data of the read-only memory for a given character may be captured using a pair of latches so that all the decoded data representing the given character may be presented at the same time.

In addition to the basic character error and scanning speed checks mentioned above, the system carries out a number of specialized error checks. Individually, these error checks are each directed towards a specific type of infrequently-encountered erroneous scanning condition or data error. Collectively, these error checks add very little to the cost of the overall system and yet render it almost impossible for the system to accept erroneous or altered data.

One occasionally-encountered error occurs when a system operator begins a manual scanning motion in the middle of an array of bar-coded characters and moves the scanning stylus outwards, eventually traversing a final start or stop character in the data array. A prior-art scanner might respond to this passage of a start or stop character by beginning to look for bar-coded characters. The present invention detects the fact that such a start or stop character is not followed by another bar-code character and does not being scanning until the stylus is returned from the edge of the record back towards the center of the record. In the preferred embodiment of the invention, this error check is carried out by the same timing mechanism which voids a scan when the speed of the scan is too slow.

It is sometimes possible for space between two adjacent bars to be accidentally or intentionally filled in, thereby converting a normal character into a start or stop character. Such a change could have the effect, for example, of reducing the apparent price of an item by reducing the number of digits which are used to represent the price. To prevent this type of error, the present invention compares the time it takes to scan any final start or stop character to the time it takes to scan the space which follows such a final start or stop character. A premature start or stop character is invariably followed by a closely spaced bar-code element, and this condition is detected by the above comparison. No data is even accepted from a record containing such a premature start or stop element. The logic which performs this comparison is also used to give an error indication if any bar-coded character is scanned at too slow a rate of speed. As an additional safegaurd, the system rejects a scan if a final start or stop character is encountered within six characters or so of an initial start character, since no record should normally have this few characters. Naturally, the number of characters may be greater or less than six in accordance with the length of the records which are to be scanned.

Another improper scanning technique which can cause errors is that of moving a stylus away from one coded section and into a second bar coded record, for example, an inventory number from one record could be combined with a price from another record in this manner. To prevent this from happening, an extension of the same counter which measures the time it takes to scan the individual bar code elements is used to set a one-half second time limit on the time it takes to scan the space separating any two characters. This time limit may also be lengthened or shortened in accordance with the nature of the records which are to be scanned.

Further objects and advantages of the invention are apparent in the detailed description which follows. The points of novelty which characterize the invention are pointed out with particularlity in the claims annexed to and forming a part of this specification.

BRIEF DESCRIPTION OF THE DRAWINGS

For a better understanding of the invention, frequent references will be made to the drawings wherein.

DESCRIPTION OF THE PREFERRED EMBODIMENT

The preferred embodiment of the present invention is a digital logic system which may be used to analyze the electrical signals generated as a result of the manual scanning of a bar-encoded record. The logic system to be described is suitable for use with any conventional type of bar code scanning stylus, or the like, so long as the signal which is generated as a result of the scanning is first processed by circuitry which converts that signal into a stable, bi-level digital signal that goes high when a bar is scanned and that goes low when the space between adjacent bars is scanned. The details of ths scanning stylus and of the digitizing circuitry used are not important to the present invention. A suitable stylus is disclosed, for example, in U.S. Pat. No. 3,509,353 or in French Pat. No. 1,323,278. A suitable amplifying circuit may be constructed, for example, using a high gain audio amplifier to drive a Schmitt-trigger-type circuit. Preferably, the amplifier and Schmitt-trigger-type circuit should be coupled together by a capacitor, and preferably a dual-level clamping circuit should be connected to the Schmitt-trigger terminal of the capacitor. Other equivalent scanning, signal amplifying, clamping, and digitizing elements may also be used in implementing the present invention.

Figure 1:
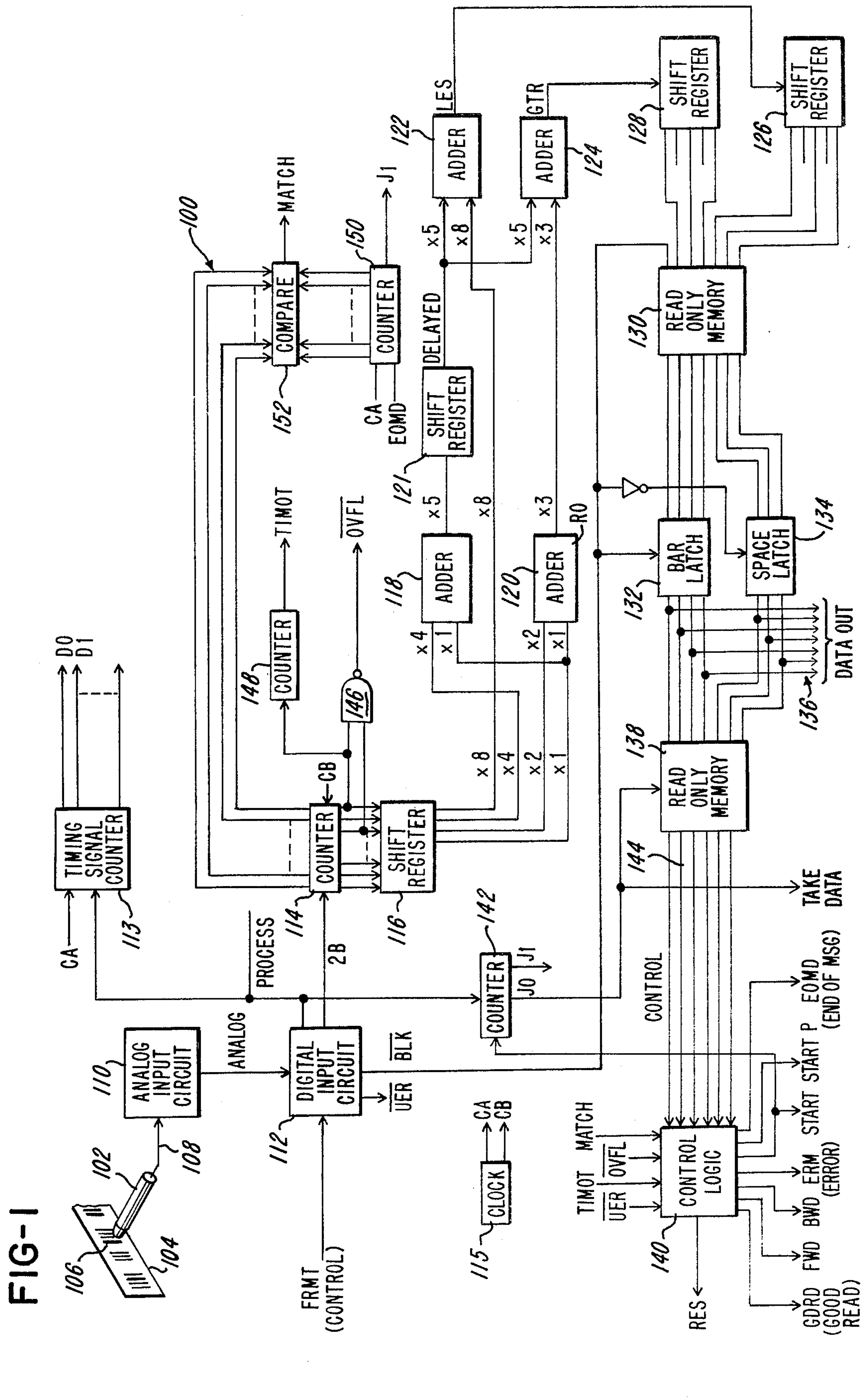
FIG. 1 is an overview block diagram of a scanning system designed in accordance with the present invention.

With reference to FIG. 1, a system 100 is shown which represents the preferred embodiment of the invention. The system 100 includes a stylus 102 which may be manually drawn across a record 104 upon which are printed a series of four-element bar code characters 106. The stylus 102 preferably contains a source of illumination for the characters 106 and means for converting the light reflected from characters 106 to an electrical signal. The electrical signal is fed over a line 108 to a conventional analog input circuit 110 the nature of which has already been briefly described. The analog input circuit amplifies, limits, and digitizes the output signal of the stylus 102 and generates a two-state signal called an ANALOG signal which goes high whenever a bar is being scanned by the stylus and which goes low when the space between adjacent bars is being scanned. For example, the signal ANALOG may be at 0 volts when a space is being scanned and at +10 volts when a bar is being scanned.

The present invention contemplates using a counter 114 to measure how long the ANALOG signal remains in either of its states and thus to measure the widths of successive bar and space code elements. To this end, the system includes a clock 115 which generates a first set of high frequency pulses CA and a second set of high frequency pulses CB such that each pulse CA is followed by a pulse CB, and vice versa. The clock 115 is a free-running clock, and it generates the CB pulses at a rate of about 200K pulses per second. These pulses are continuously made available to the counter 114.

In response to a fluctuation of the ANALOG signal in either direction, a digital input circuit 112 clears the counter 114 by generating a short-duration 2B signal pulse At approximately the time when the 2B signal pulse terminates, the counter 114 commences to count the CB pulses which are generated and continues to count these pulses until the next subseqent generation of the 2B signal pulse in response to a fluctuation of the ANALOG signal. Since the ANALOG signal fluctuates each time the stylus 102 passes a bar-to-space or space-to-bar transition, the counter 114 is permitted to count for the time it takes the stylus 102 to scan each bar and space element. After each such element is scanned, the counter 114 is left containing a number proportional to the time which it took the stylus to scan the bar or space element. Immediately prior to the clearing of the counter 114 by the 2B signal pulse, the contents of the counter 114 are loaded into a shift register 116. In this manner, the shift register is successively loaded with digital values proportional to the time which it takes the stylus 102 to traverse each successive bar and space element of each character 106 that is printed upon the record 104.

The next step in the process of decoding the bar-and-space-code information is that of determining the relative widths of the bar and space code elements of each character. To aid in error detection, each character contains one wide and three narrow bars, and one wide and two narrow spaces. The width of each bar element of a character is compared to the width of the one or two adjoining bar element or elements of the same character. The width of each space element of a character is compared to the width of the adjoining one or two space element or elements of the same character. Since each character includes four bar elements, three comparisons of bar widths are carried out — the width of the first to the width of the second, the width of the second to the width of the third, and the width of the third to the width of the fourth. Since each character includes three space elements, two comparisons of space width are carried out — the width of the first to the width of the second, and the width of the second to the width of the third. Five comparisons are thus carried out upon each character. The result of each comparison is either that one bar (or space) is wider than the other bar (or space), that the bars (spaces) are of approximately equal width, or that one bar (or space) is narrower than the other bar (or space). By assigning the binary number 10 to a "greater than" result, the binary number 01 to a "less than" result, and the binary number 00 to a "same width" result, the results of the five comparisons may be represented by five pairs of binary numbers or by a single 10-bit binary number. This 10-binary number may then be simply decoded into any desired binary code representations of the character that corresponds to the set of bar and space code elements. The 10-bit number may, for example, be used to address a location within a read-only memory that contains a corresponding character code.

The general mathematical technique used to determine whether a first bar or space is wider than, narrower than, or the same width as a second bar or space is that of multiplying the scanning-time-duration for the first bar or space by a first constant greater than one and by a second constant less than one, and then comparing the scanning-time-duration for the second bar or space to the resulting products. If the time-duration of the first bar or space multiplied by the constant greater than one is still smaller than the time duration of the second bar or space, then it may be assumed that the second bar or space is wider than the first bar or space by a safe margin. If the time duration of the first bar or space multiplied by the constant less than one is still greater than the time duration of the second bar or space, then it may be assumed that the second bar or space is narrower than the first bar or space by a safe margin. However, if neither of the above two criteria are satisfied, then it is assumed by default that the two bars or spaces are of roughly equal width.

The particular apparatus which is used for carrying out the above-described comparisons is disclosed in FIG. 1. The shift register 116 has four parallel signal outputs which are respectively labelled $x1$, $x2$, $x4$, and $x8$. These are simply output lines connecting to successive stages at the output end of the shift register 116. Initially, a binary number representing the time-measured width of a bar or space code element is loaded into the shift register 116 from the counter 114. This number, which hereinafter is referred to as a "count value," is immediately thereafter shifted forward in the shift register 116 so that the binary digits which comprise the count value appear in serial form on each of the signal lines $x1$, $x2$, $x4$, and $x8$. The same signal is presented to each signal line, but the signal appears at a slightly later time on each successively higher-numbered signal line. More precisely, the least significant bit of the count value first appears on the $x1$ signal line. This same bit appears again on the $x2$ signal line at the same time that the second-to-the-least significant bit of the count value is appearing on the $x1$ signal line; the least significant bit then appears on the $x4$ signal line at the same time that the second-to-the-least significant bit appears on the $x2$ signal line and the third-to-the-last significant bit appears on the $x1$ signal line, and so on.

This shifting in time of the data bits which flow from the shift register 116 over the $x1$, $x2$, $x4$, and $x8$ signal lines is equivalent to multiplying the count value applied to each line by the number that is assigned to that line. Hence, the count value applied to the $x1$ signal line is multiplied by one, while the count value applied to the $x2$ signal line is multiplied by two, and so on. An analogy may be helpful in explaining why this is so. Consider the decimal number 9,680. If each digit in this number is shifted one position to the left and if a zero is added to the right, this number is effectively multiplied by ten and becomes 96,800. The shifting of digits to the left is equivalent to multiplication by ten because ten is the base number of the decimal number system. By direct analogy, if a binary number has its digits all shifted one bit position to the left and if zero is added to the right, the binary number is effectively multiplied by 2. For example, the binary number $101_2$, which is equivalent to the decimal number $5_{10}$, becomes, after a one-bit-position shift, the binary number $1010_2$ which is equivalent to the decimal number $10_{10}$. It is thus apparent that the shifting of a binary number by one bit position is equivalent to multiplying that number by 2. The shift register 116 effectively executes such a one-bit-position shift of the count value which is applied to the successive signal lines $x1$, $x2$, $x4$, and $x8$ and thereby multiplies the count value applied to each line by the indicated constant.

In order to carry out the comparison of a first count value to a second count value multiplied by constants that are respectively greater than one and less than one, the present invention computes five times each count value, eight times each count value, and three times each count value. The invention then compares five times a first count value to eight times a second count value and also to three times the second count value. The comparison of five times the first count value to eight times the second count value is equivalent to comparing the first count value to 8/5 times the second count value and is thus equivalent to comparing the first count value to the second count value multiplied by a constant greater than one. Similarly, the comparison of five times the first count value to three times the second count value is equivalent to comparing the first count value to 3/5 times the second count value and is thus equivalent to comparing the first count value to the second count value multiplied by a constant less than one.

Five times a count value is simply computed by adding together four times the count value and one times the count value. The signal line labelled $x4$ leading from the shift register 116 presents a number equal to four times each count value in serial form, and the signal line labelled $x1$ leading from the shift register 116 presents in serial form a number equal to each count value. These two serial numbers are added together by means of a serial adder or arithmetic unit 118, and the sum is represented by the adder 118 output signal. This output signal is labelled $x5$, since it is five times the basic count value. In a similar manner, three times the basic count value is computed by a serial adder or arithmetic unit 120 which accepts as inputs the $x1$ and the $x2$ output signals from the shift register 116 and which adds these together to compute a $x3$ signal.

It is intended that the width of bars are to be compared to the width of other bars and that the width of spaces are to be compared to the width of other spaces. To achieve this end, it is necessary to store the count values corresponding to the time-measured widths of a first bar and of the immediately following space so that the count value representing the width of the first bar may be compared to the count value representing the width of the next-to-follow bar. For this reason, the $x5$ output of the adder 118 is fed into a shift register 121 which has sufficiently capacity to store two complete count-values-times-five presented by the counter 114. The output of the shift register 121 may be called the DELAYED $x5$ signal. The length of the shift register 121 is chosen so that when the input shift register 116 is presenting a count value proportional to the length of a bar the shift register 121 is presenting five times a count value proportional to the length of the bar most recently scanned previously. A serial adder or arithmetic unit 122 then computes the difference between the binary numbers presented by the DELAYED $x5$ signal line and the $x8$ signal line and thus determines whether the more-recently-scanned bar is narrower than the previously-scanned bar. If the number presented by the $x8$ signal line proves to be smaller than the number presented by the DELAYED $x5$ signal line, the adder 122 generates a high level output signal called the LES (less than) signal. If the number presented by the $x8$ signal line is equal to or smaller than the number presented by the DELAYED $x5$ signal line, then the adder 122 generates a low level output signal. At the same time, another adder or arithmetic unit 124 computes the difference between the binary numbers presented by the DELAYED $x5$ signal and the $x3$ signal and thus determines whether the most recently scanned bar is wider than the previously scanned bar. If the number presented by the $x3$ signal line proves to be greater than the number presented by the DELAYED $x5$ signal line, the adder 124 generates a high-level output signal called the GTR (greater than) signal. Otherwise, the adder 124 generates a low-level signal. In this manner, the adders 122 and 124 are able to compare the relative widths of adjacent bars and then generated the output signals LES and GTR which together indicate whether the most recently scanned bar is wider than, the same width as, or narrower than the previously scanned bar in accordance with the binary width code previously explained. The relative widths of adjacent spaces are compared in precisely the same manner.

The output signal of the adder 122 is fed into a shift register 126, and the output of the adder 124 is fed into a shift register 128. The shift registers 126 and 128 are sufficiently long to store binary numbers representing the results of all the five width comparisons for a single character. To properly decode the 10-bit number that is presented by these two shift registers could conceivably require the services of a read-only memory containing more than 1,000 storage locations. The present invention, therefore, contemplates decoding the bar and space code comparison information separately using a smaller-sized read-only memory 130 which contains only 128 addressable storage locations. A signal BLK generated by the digital input circuits is fed into an address-line input of the read-only memory to inform the memory 130 of whether or not it is receiving comparison information relative to the width of bars or of spaces at any given moment. Alternate outputs of the shift registers 126 and 128 are then selected to feed the remaining address-line inputs of the read-only memory. In this manner, each possible combination of bar and space width comparison data is able to cause data to be retrieved from a unique location within the read-only memory 130. Alternate outputs of the shift registers are selected so that only bar or space comparison data is fed into the read-only memory at any given moment in time.

Figure 5:
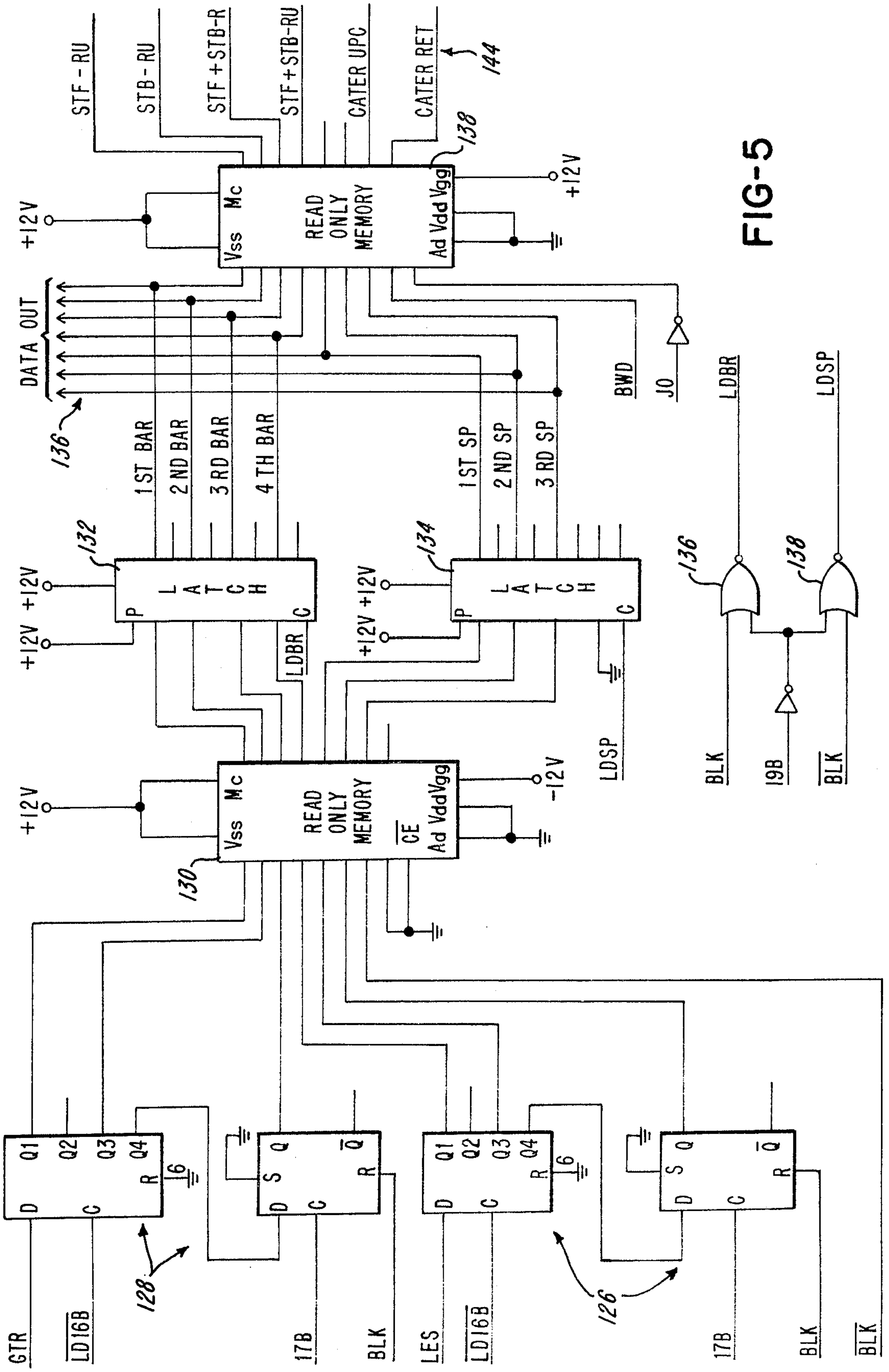
FIG. 5 is a logic diagram of the shift registers 126 and 128, the read-only memories 130 and 138, and the latches 132 and 134.

Four of the memory 130 outputs are fed into a bar latch 132. The latch 132 is actuated after each presentation of bar width comparison data by the shift registers 126 and 128 to store data presented by the memory 130. The latch 132 is actuated by the presence of the same BLK signal which informs the read-only memory 130 of whether it is decoding bar or space information. Three of the memory 130 outputs are fed into a space latch 134. The latch 134 is actuated after each presentation of space width comparison data by the shift registers 126 and 128 to store data presented by the memory 130. The latch 134 is actuated by the absence of the BLK signal and thus stores only data relevant to space comparisons. In this manner, the bar and space comparisons for a character are separately decoded and are stored within the latches 132 and 134 for simultaneous presentation to a single data output 136. In the preferred embodiment of the invention, the read-only memory 130 simply transforms the comparison information into binary information as to the actual widths of the bars and spaces within each character. Since there are four bars within a character, the read-only memory 130 generates 4 bits of output data when it interprets bar comparison information. Since there are only three spaces within a character, the read-only memory 130 generates three bits of output data when it interprets space comparison information. The outputs of the two latches 132 and 134 may be combined, as is illustrated in FIG. 1, so that the bar and space code data is presented to the data output 136 in the same order that the varying-width bar and space code elements appear within the character that was scanned. Alternatively, the outputs may be presented as is illustrated in FIG. 5 or in any other suitable manner.

A second read-only memory 138 that is addressed by the output signals from the bar and space latches 132 and 134 checks for the presence of special start characters and also performs parity and other routine error checks upon the retrieved data. Various control and other output signals flow from the read-only memory 138 to the control logic 140.

The control logic 140 controls the operation of the overall system and also coordinates the system operation with the functioning of an external data storage or utilization device to which the retrieved and decoded data is presented. Among other functions, the control logic 140 generates signals FWD (forward) and BWD (backward) to indicate whether a scan is proceeding in a forward or reverse direction. In case of an error, the control logic 140 generates an ERM (error in message) signal. When the end of a message is encountered, the control logic generates an EOMD signal (end of message) and also a GDRD (good read) signal if the message was accurately captured. When a valid start character is first encountered in a bar-encoded message, the control logic 140 generates a START P (start pulse) pulse signal which is of short duration and then continuously generates a START signal until a complete set of characters followed by a second start character has been read from the message. The control logic 140 also initiates the resetting of the entire system 100 after a message has been read or after an error has been encountered by generating an RES (reset) signal. As will be explained in more detail at a later point, the control logic 140 also accepts as input signals a variety of error signals which indicate the results of various error checks that are automatically carried out during any scanning operation.

The system 100 is designed to feed data to some external data storage device (not shown). The system 100 is controlled by a FRMT signal, and the system does not generate any output data except when the FRMT signal is absent.

Other system signals also may be fed to the external data storage or utilization device. The digital representation of each bar-coded character would normally be fed to the external device over the DATA OUT signal lines. A TAKE DATA signal (elsewhere called the JO signal) signals when data is to be accepted from the DATA OUT signal lines. The TAKE DATA signal terminates whenever data is to be accepted.

The present invention contemplates that any valid message shall commence with a particular start code character and shall terminate with a particular stop code character. In the preferred embodiment of the invention, the start and stop code characters are identical and are always referred to as start code characters in the paragraphs which follow. These characters are special characters which may be read in either direction by the system and which, in addition to signalling the beginning or end of a message, indicate the direction in which scanning is to proceed by their particular coding. It is contemplated that the scanning of a bar code may begin any place upon a record — even right in the middle of a valid character. Typically, an unskilled employee using a scanning stylus simply places the stylus upon a bar code and swings the stylus back and forth over the bar code one or more times using the same motion that one would use in scratching out a line of printed text using a pencil. This motion may begin at the center of a record or it may begin off to one side of the record. The swings of the stylus may go all the way across the record and into the space beyond the record or they may not swing far enough to include the start and stop characters at the end of the record. The stylus swings may also be at an angle such that the stylus momentarily leaves the bar code and then re-enters the bar code at another point. It is important that the present invention be able to ignore all erroneous scans and accept only the valid data which results when a given motion of the stylus begins on one side of a complete set of characters and continuous all the way across to the opposite side in one continuous motion.

Towards this end, it is necessary that the system 100 reject all scanning information which it receives until it first encounters a bar code pattern which corresponds to a valid start or stop code character. After that time, it is necessary that the system 100 keep track of precisely where each character begins and terminates so that character information may be decoded by the read-only memory only after a complete series of four bars and three spaces have been scanned.

A counter 142 performs both of these tasks. The counter 142 is an eight-stage Johnson counter which normally counts through the eight unique states J0, J1, J2, J3, J4, J5, J6 and J7 and then returns to the initial state J0. However, when the control logic 140 is not generating the START signal, the absence of this signal locks the counter 142 in the J0 state and prevents the counter 142 from advancing. When the counter 142 is in the J0 state, it generates a J0 output signal which enables a read-only memory 138 to accept as an address input signal any data that is stored in the two latches 132 and 134 and to continuously generate a series of control signals 144, some of which indicate whether the bar and space latches 132 and 134 are presenting the code that corresponds to a valid start or stop character. Hence, when the manual scanning of a record first begins, data defining any pattern of light-to-dark and dark-to-light transitions encountered upon the scanned record are fed continuously into the read-only memory 138. Since the control logic 140 is not generating the START output signal at this time, the data presented by the latches 132 and 134 to the data output 136 may be simply ignored by whatever external device is connected to the output 136.

Eventually, the stylus 102 is drawn over a valid start or stop character. As the stylus 102 reaches the space following such a character, the elements of the system described above cause binary data defining the width of the bars and spaces in the start or stop character to be stored within the latches 132 and 134. The read-only memory 138 is then presented with the coding for a valid start or stop code character. In response, the read-only memory supplies control signals 144 to the control logic 140. The logic 140 causes a START P pulse to be generated and also causes the START signal to go high and remain high. A high level START signal releases the Johnson counter 142 and permits that counter to begin counting the fluctuations of the PROCESS signal. Since the process signal is generated each time the scan proceeds from a bar to a space, the counter 142 commences to count the bar-space and space-bar transitions. The counter 142 resets when it reaches a count of eight which is equal to the number of bar-space and space-bar transitions encountered in scanning a complete four-bar character. Hence, the J0 signal goes high just after the scan enters the last bar of each character and remains high until just after the scan enters the space which separates adjoining characters. The termination of the J0 signal indicates when data representing a complete character is available at the DATA OUT terminals 136. The J0 signal disables the memory 138 when it is absent and prevents the memory 138 from performing an error check upon the data presented by the latches 132 and 134 at times when the latches contain data relating to portions of two distinct characters.

Error checks are carried out by various elements show in FIG. 1. The digital input circuit 112 measures the time duration of each bar and space scan to insure that scanning proceeds at a speed which permits proper operation of the system 100. If a bar or a space code is encountered which is scanned too quickly to be validity processed, the circuitry 112 then generates a VER signal which is fed into the control logic 140 to abort the scan. If the scanning proceeds to slowly within a given character, a gate 146 responds to the counter 114 reaching a predetermined count by generating an OVFL (overflow) signal which also can abort the scan. A counter 148 is serially connected to the most significant output of the counter 114 to allow the measurement of extended time intervals — for example, the time which it may take the stylus to move from one character to the next. It is important that the intercharacter time be limited so that the stylus cannot be moved from one line of bar coding to another between characters. The counter 148 therefore generates a TIMOT (time out) signal which can abort a scan if the inter-character timing is too long.

Ordinarily, a scan is completed when a terminating start (or stop) character is encountered. Such a character should not be followed by another character within a short distance, since that would indicate that the start or stop character has been encountered prematurely and may indicate that the bar code has been altered in some manner. For this reason, a counter 150 measures the time it takes to scan each character. After a terminating start character is encountered, the counter 150 is locked by an EMOD (end of message) signal that is generated by the control logic 140. During the scanning of the space which follows the last bar in such a character, a comparison gate or compare 152 compares the output of the counter 114, which represents the width of the following space, to the output of the counter 150, which represents the width of the final start character. If the following space is more than a certain multiple of the width of the final start character, the comparison gate 152 generates a MATCH signal which tells the control logic 140 that there is a reasonably long space following the final start character. In the preferred embodiment of the present invention, the space following the last bar must be at least 0.07 inches in width before the MATCH signal can be generated.

The system does not respond to an initial start character which is not followed immediately by another character. The mechanism which is used to detect underspeed scanning is also used to measure the time it takes to scan the space that follows an initial start character. If the space is unusually wide, then the start character is rejected. Thus, a scanning motion which proceeds outwards from the center of a bar-coded region is ignored. Only scanning motions which begin at the edge of a record are recognized as valid. An unskilled operator may therefore begin a zig-zag scanning motion at any point upon a record, and the system will capture data from all such motions which passes over the entire bar code from one end of the record to the other.

Introduction to Circuit Description

The preferred embodiment of the invention is constructed using complementary-symmetry metal-oxide semiconductor integrated circuits. In particular, "COS-MOS" (registered trademark) integrated circuits manufactured by the Solid State Division of the R. C. A. Corporation, Summerville, N.J. are used in constructing the preferred embodiment. What follows is a brief description of the integrated circuits used:

| COS-MOS TYPE NUMBER | BRIEF DESCRIPTION |
|---|---|
| 4001 | Two-input NOR gates |
| 4006 | Sixteen stage shift register |
| 4007 | NOT or inverting gates |
| 4011 | Two-input NAND gates |
| 4012 | Four-input NAND gates |
| 4013 | Type "D" flip-flops |
| 4015 | Four-stage shift registers having serial and parallel inputs and outputs |
| 4017 | Ten-stage decade counter (sequential type) |
| 4021 | Eight-stage parallel-in, serial-out shift register |
| 4022 | Eight-stage Johnson counter |
| 4023 | Three-input NAND gates |
| 4025 | Three-input NOR gates |
| 4030 | Exclusive-OR gates |
| 4032 | Serial adders |
| 4040 | Twelve-stage binary counter |
| 4042 | Latch |
| 4049 | Inverter |

In the detailed description which follows, conventional integrated circuit logic symbols have been used throughout. More specifically, a D-shaped gate indicates an AND logic function and a circle at the output of such a gate indicates a NAND logic function. An arrow-shaped gate indicates an OR logic function and a circle at the output of such a gate indicates a NOR logic function. A triangular gate having a circle at its output indicates a NOT or inverting function. Vertical rectangular boxes having letters Q and $\overline{Q}$ at their output are typically type D flip-flops which have the following characteristics: if the D input to the flip-flop is high when the C input goes from low to high, then the flip-flop immediately starts to generate a high level Q output signal and a low level $\overline{Q}$ output signal; if the D input is low when the C input goes from low to high, then the Q output immediately goes low and the $\overline{Q}$ output immediately goes high. The Q output of such a flip-flop may also be set high by applying a high level signal to an S or set input of such a flip-flop, and may be set low by applying a high level signal to an R or reset input of such a flip-flop. In every case, the $\overline{Q}$ output signal is always the inverse of the Q output signal. In some instances, shift register devices are also shown as having a D input terminal, a C input terminal, etc. It is to be understood that such shift registers comprise a series of type D flip-flops connected serially to form a shift register, or its equivalent.

A gate that resembles an arrow shaped NOR gate but that has an extra curved line at its left-hand edge is an EXCLUSIVE OR (EXOR) gate.

While complementary symmetry metal-oxide semiconductor integrated circuits were used in constructing the preferred embodiment of the invention, it is to be understood that any suitable type of integrated or discrete logic may be used to implement the invention.

In the figures, inverted signals are clearly indicated by overlining. A signal which is not overlined is "present" when the signal is at a high or positive level and is "absent" when the signal is at a low or negative level. An overlined signal is present when the signal is at a low or negative level and is absent when the signal is at a high or positive level. Since the nature of each signal (inverted or noninverted) is clearly indicated in the drawings, normally no reference will be made to whether or not a signal is inverted in the text which follows. A signal will be simply said to be present or absent, and the actual polarity of the signal may be determined by references to the drawings. Inverting gates which do nothing but change a non-inverted signal to an inverted signal or vice versa are normally not mentioned in the description which follows, since their function is apparent in the drawings.

Logic gates in general perform a gating (AND) logic function, a signal passing (OR) logic function, an inverting (NOT, EXOR) logic function, or a combination of these functions. In the case of an OR gate which simply passes all of its input signals to its output, signals will be said to "pass through" the gate and normally no further discussion of the gate's operation will be included. In the case of an AND gate which is performing a gating or signal control function, the gate will be said to be disabled if a given signal is blocked from passing through the gate. If a given signal is able to pass through the gate, the gate is said to be "enabled." If the gate has more than two input signals and if some but not all of the input signals are disabling the gate from passing a signal, the gate is said to be "partly enabled."

Detailed Circuit Description

Figure 2:
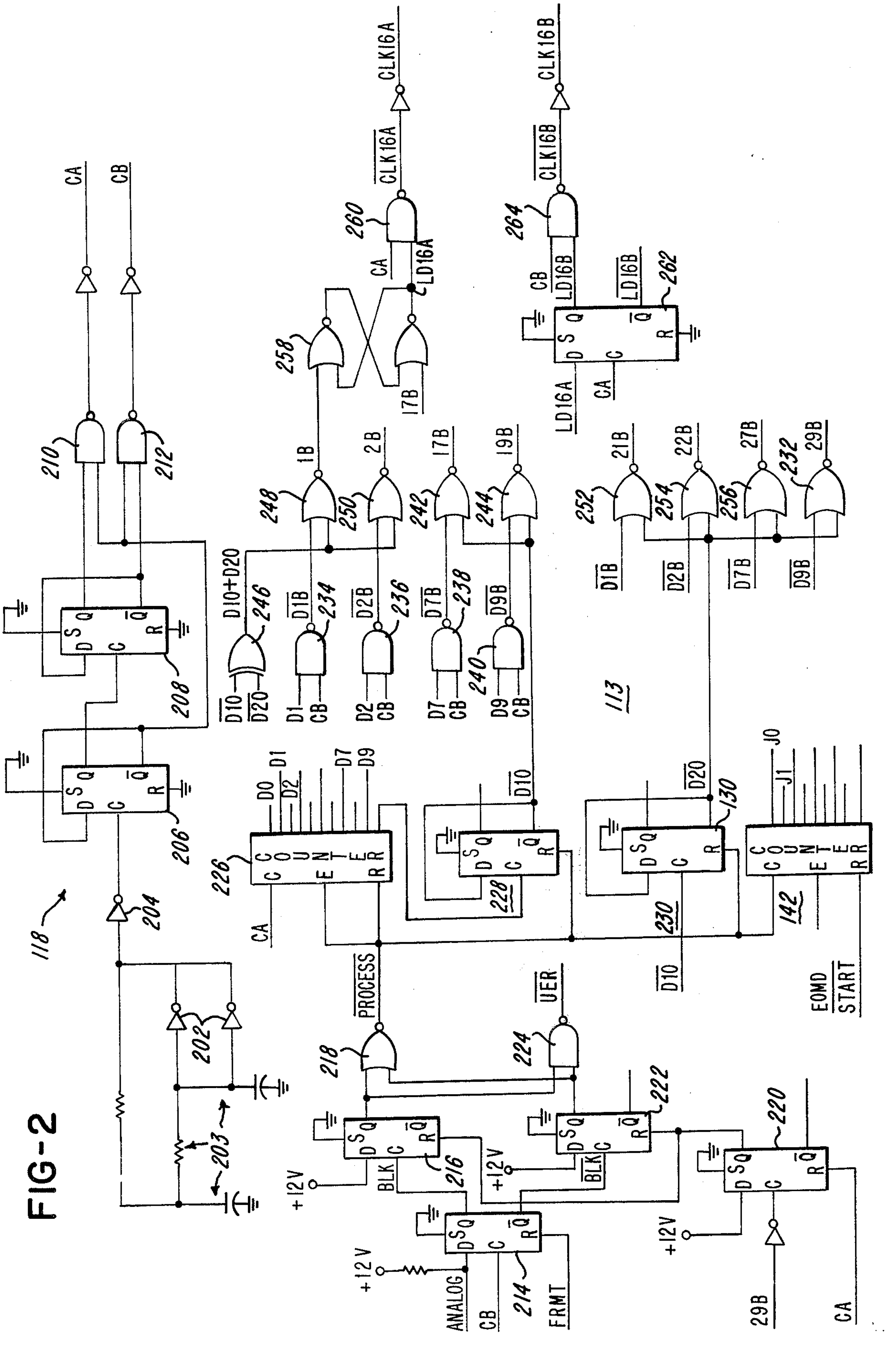
FIG. 2 is a logic diagram of the digital input circuit 112, of the system clock 115, and of the timing signal counter 113.

FIG. 2 is a logic diagram illustrating the details of a digital input circuit 112, the clock 118, and the timing signal counter 113. As has been stated previously, the clock 118 is a simple pulse generating clock which generates a train of CA pulses and which simultaneously generates a train of CB pulses interspersed between the CA pulses. The pulse generator portions of the clock 118 comprise a pair of NAND gates 202 which have their outputs connected through a simple R-C time delay network 203 back to their inputs to form a very simple oscillator. The output signal of the gates 202 is simply a rectangular waveform which reverses each time the capacitorswithin the R-C network 203 charge or discharge to the point where the inputs of the gates 202 are raised above or lowered below their normal threshold switching levels. A gate 204 squares up this rectangular waveform and applies it to the clock input of a first type-D flip-flop 206. The flip-flop 206 has its inverted Q output strapped to its D input, and this causes the flip-flop to change its state in response to each pulse it receives from the gate 204. The Q output of the flip-flop 206 is connected to the clock input of a second flip-flop 208 which also has its inverted Q output strapped back to its D input. The two flip-flops 206 and 208 form a simple two-stage binary counter that continuously counts through four successive states and then resets. During one of these states, a gate 210 receives all high-level inputs and generates an output pulse CA. During another of these states, a gate 212 receives all high level inputs and generates an output pulse CB. The gates 210 and 212 are connected to the two flip-flops in such a manner that the pulses CA and CB occur alternately and are separated from each other by a brief time delay. The frequency of the CA pulses is 200K pulses per second, and the frequency of the CB pulses is the same.

The digital input circuit 112 occupies the lower left portion of FIG. 2. The ANALOG signal supplied by the analog input circuit 110 is applied to the D input of a flip-flop 214. The CB timing pulses are fed into the clock input of the flip-flop 214. When the ANALOG signal goes high in response to the scanning of a bar element, the next following CB pulse sets the flip-flop 214 and causes the Q output of the flip-flop 214 (labelled BLK in FIG. 2) to set a flip-flop 216. An inverted Q output signal of the flip-flop 216 passes through a gate 218 and becomes the PROCESS pulse signal which signals the scanning of a space-to-bar transition. The duration of the PROCESS pulse signal is determined by how long the flip-flop 216 is allowed to remain set. This, in turn, is determined by a flip-flop 220 which clears the flip-flop 216 after a predetermined time delay, as will be explained. The flip-flop 220 is then reset by a CA pulse.

When the ANALOG signal goes low, the next following CB pulse clears the flip-flop 214 and causes the inverted output of that flip-flop to set a flip-flop 222. The Q output of the flip-flop 222 then also passes through the gate 218 and becomes a PROCESS pulse which signals the scanning of a bar-to-space transition. The flip-flop 222 is cleared after a brief time delay by the flip-flop 220 in the same manner that the flip-flop 216 was cleared. The digital input circuit thus responds to each fluctuation of the ANALOG signal by generating a PROCESS pulse of short duration at the output of the gate 218. The Q output of the flip-flop 214 is called the BLK signal and indicates whether a bar or a space is being scanned.

If the scanning stylus motion is so fast that a narrow bar or space is scanned in too brief an interval for the logic circuitry to respond, the ANALOG signal fluctuates a second time before one of the flip-flops 216 or 222 is cleared. This can also happen if a thin mark on a record is mistaken for a very narrow bar. Such a second fluctuation of the ANALOG signal causes the other of the two flip-flops 216 and 222 to be set so that both of the flip-flops are set. A Q output from each of the two flip-flops then fully enables a gate 224 to generate a UER error signal. This UER error signal is fed to the control logic 140 which responds by aborting the scan. Normally, the two flip-flops 216 and 222 are never set simultaneously and the UER signal is never generated.

The timing signal counter 113 occupies the central portion of FIG. 2. The J counter 142 appears at the bottom of FIG. 2. Both of these computers are controlled by the PROCESS pulses generated at the output of the gate 218.

The timing signal counter 113 comprises a series of counter stages 226, 228, and 230 which count from zero to twenty-nine whenever the PROCESS signal is present. The twenty-ninth count of the timing signal counter is fed back to the C input of the flip-flop 220 and resets that flip-flop, thereby terminating the PROCESS signal. When the PROCESS signal is not present, the output of the gate 218 goes high and locks the counter stages 226, 228, and 230 in their cleared or reset states. Each time a PROCESS pulse occurs, the output of the gate 218 goes low and permits the timing signal counter to count from 0 to 29.

The counter stage 226 is a conventional decade counter stage having 10 independent outputs which go high in sequence. These outputs are labelled D0, D1, D2, . . . , D9. The most significant input is applied to the C (clock) input of the counter stage 228 — a simple flip-flop having its inverted Q output strapped back to its D input. When the counter stage 226 advances from a count of D9 to a count of D0, it sets the counter stage 228 and causes that stage to generate a D10 output signal. The counter stage 226 then counts a second time. When the counter stage 226 again advances from a count of D9 to D0, it generates an output pulse which clears the stage 228 and thus terminates the D10 output signal. The stage 228, in turn, sets a similar flip-flop counter stage 230 and thus causes the generation of a D20 output signal. The counter stage 226 then counts again from DO to D9 with the D20 output signal present to indicate a count from 20 up to 29. When a count of D9 is again reached, the D20 signal and a D9B signal (D9 strobed by a CB pulse) combine to cause a gate 232 to generate a 29B signal which toggles the flip-flop 220 and causes the PROCESS signal to terminate. The flip-flop 220 is then cleared immediately by the next CA pulse generated by the clock 115.

The output signals generated by the counter stages 226, 228, and 230 may be combined in any desired way to obtain any desired sequence of timing signals each of which may endure for any desired number of CA or CB clock pulses. The gates shown in the right half of FIG. 2 simply combine timing signal counter outputs with the CA and CB timing pulses in such a way as to generate the necessary timing signals for controlling the operation of the system. For example, the gates 234, 236, 238, and 240 strobe selected outputs of the counter stage 226 with the clock output pulses to thereby generate CB clock output pulses each of which occurs at three selected count values during the 0-to-29-count timing interval. These pulses are labelled D1B, D2B, D7B, and D9B. A pair of gates 242 and 244 pass the pulses D7B and D9B only when the counter stage 228 is set and generate pulses 17B and 19B in synchronism with the CB clock pulses during the 17th and 19th counts of the timing signal counter. A gate 246 senses when the two timing clock states 228 and 230 are both cleared and enables a pair of gates 248 and 250 to pass D1B and D2B timing pulses when the timing signal counter is at counts of 1 and 2 respectively and only at those counts. The gates 252, 254, 256, and 232 pass the pulses D1B, D2B, D7B, and D9B only when the counting state 230 is set and thus supply CB timing pulses only during 21st, 22nd, 27th, and 29th counts of the timing signal counter respectively. The signals 1B, 2B, 17B, 19B, 21B, 22B, 27B and 29B are thus pulse signals which are synchronized with the CB clock signals and which occur when the timing signal counter reaches corresponding count values.

A bistable device 258 is set by the 1B timing pulse and is then cleared by a 17B timing pulse. This bistable 258 thus generates a high level output signal LD16A that encompasses exactly sixteen CA clock pulses and that begins and terminates in synchronism with CB clock pulses. The LD16A signal is used to enable a gate 260 to pass exactly sixteen CA clock pulses into a signal line CLK16A which may be used to control the transfer of 16-bit numbers through shift registers and the like within the system arithmetic unit. The LD16A signal is also applied to the D input of a flip-flop 262 that is strobed by a CA clock pulse. An LD16B signal appears at the output of the flip-flop 262 which encompasses exactly sixteen CA clock pulses and which begins and ends in synchronism with the CA clock pulses. This LD16B signal is used to enable a gate 264 to pass exactly sixteen CB timing pulses into a CLK16B signal line. The CLK16B signal may also be used to control the operation of shift registers, arithmetic units, and the like.

The Johnson counter 142 appears at the bottom of FIG. 2. This counter simply counts the number of PROCESS pulses which appear at the output of the gate 218. The counter 142 is initially locked in a reset state generating the signal J0 by the absence of an inverted START signal that is applied to a reset input of the counter 142. When the inverted START signal is present, the counter 142 counts freely from J0 up to J7 and back to J0 and is advanced by the trailing edge of each PROCESS pulse. The signal J0 always reappears shortly after a scan begins to cross the last bar of each character on a record.

Figure 3:
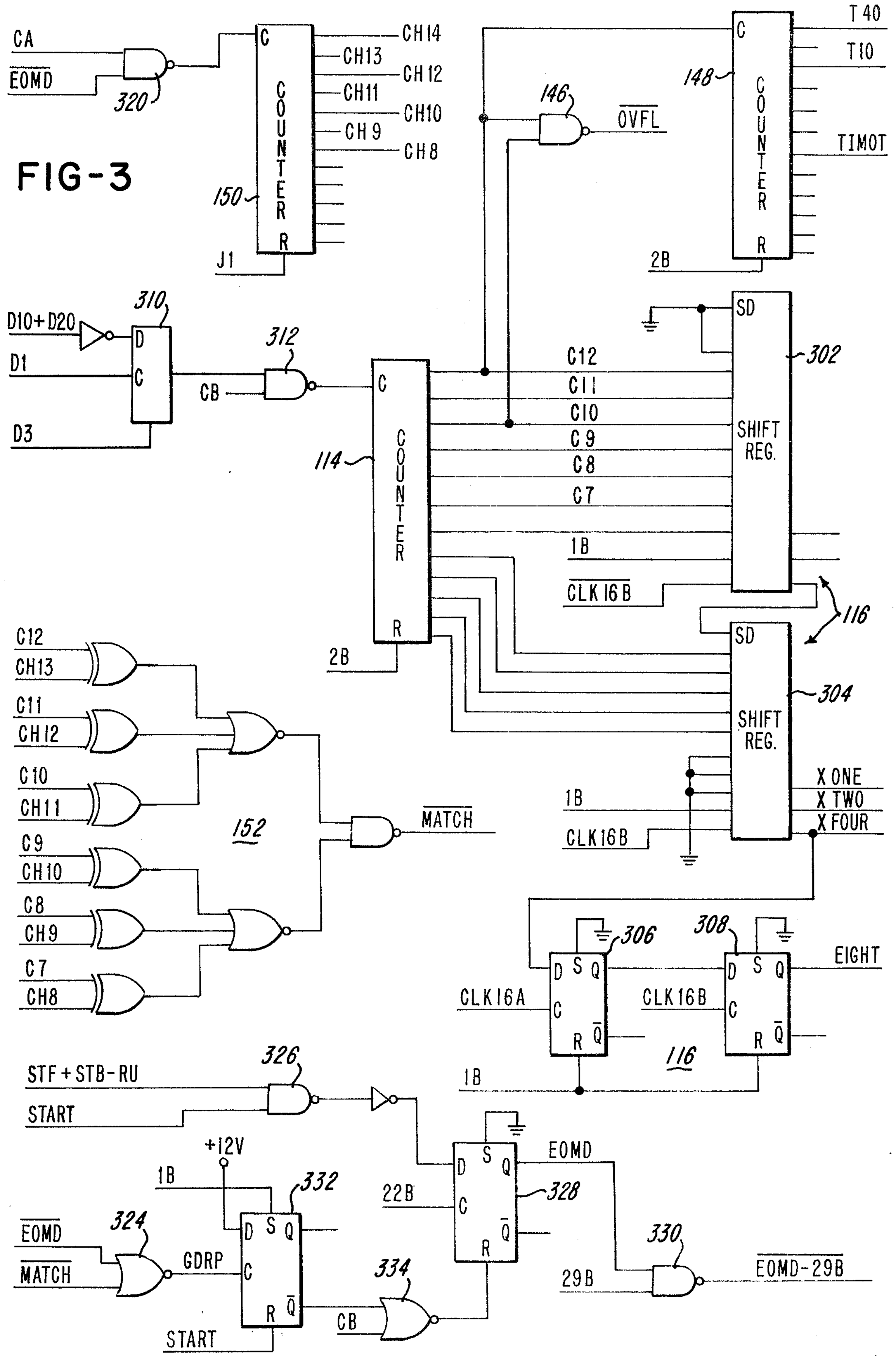
FIG. 3 is a logic diagram of the counters 114, 148, and 150, the shift register 116, the compare 152 and portions of the control logic 140.

FIG. 3 is a logic diagram representation of the bar and space width counter 114, the shift register 116, the counter 150, the compare logic 152, and elements of the control logic 140 which generate the EOMD (end of message) signal. These elements of FIG. 3 are described below in the order just indicated with the exception of the logic circuitry that generates the EOMD signal. The latter logic circuitry will be described at a later point.

The counter 114 is a 12-bit binary counter having a 12-bit capacity. The twelve outputs of the counter 114 are fed into twelve inputs of the shift register 116. The shift register 116 comprises two integrated-circuit shift registers 302 and 304 and a single-bit shift register stage which is constructed from a pair of flip-flops 306 and 308 connected serially to the output of the shift register stage 304.

The counter 114 and the shift register 116 are controlled by the timing signals developed by the timing signal counter. Immediately after a level transition of the ANALOG signal caused by the scan processing from a bar to a space or vice versa, the digital input circuit generates a PROCESS pulse which endures for twenty-nine timing signal counts. At a count of one on the timing signal counter, a 1B timing signal transfers the contents of the counter 114 into the shift register 116. At about the same time, a D1 timing signal sets a flip-flop 310 which disables a gate 312 from passing any CB timing pulses to the counter 114 input.

At a count of 2, a 2B pulse clears the counter 114. At a count of 3, a D3 pulse clears the flip-flop 310 which enables the gate 312 to pass CB pulses to the count input of the counter 114. The counter is thus reset and begins counting CB pulses to measure the width of the next bar or space. A count value representing the width of the preceding bar or space is now stored in the shift register 116.

Beginning with a timing signal count of two, sixteen CB clock pulses are applied to the shift inputs of the shift register 116 to cause serial presentation of the count value stored therein. In the case of the extra shift register stage constructed from the flip-flops 306 and 308, sixteen CA pulses are fed into the flip-flop 306 and sixteen CB pulses are fed into the flip-flop 308. The count value appears on the signal lines ONE, TWO, FOUR, and EIGHT, as has been explained. As has also been explained, the count value is effectively multiplied by the numbers indicated.

When the counter 114 reaches a predetermined high level count, a gate 316 generates an OVFL signal to signal that a particular count value has been passed. The OVFL signal is used to signal when a bar or space element is either too long or is scanned too slowly, and it is also used to signal when the space following a start character is too wide.

The most significant output C12 of the counter 114 feeds the count input of a second counter 148. The counter 148 generates output signals T+O, T/O, and TIMOT when various count values are reached. In effect, the counter 148 is simply an extension of the counter 114 that enables longer time intervals to be measured by the counter 114. For example, the TIMOT signal occurs only if too long a time is taken to move the stylus from one character to the next. In the preferred embodiment of the invention, the TIMOT count value is selected to measure out a time interval of about 0.5 seconds. Scanning must proceed from one character to the next within that time interval or else the scan is aborted. The TIMOT signal prevents one from moving the stylus from one bar code to an adjacent bar code in the middle of a scan.

A 14-stage counter 150 (FIG. 3) insures that a long space follows the last bar in a message. The counter 150 is reset by a J1 signal during the scanning of the space between characters. The counter J1 then measures the approximate time it takes to manually scan each character by counting CA pulses while the character is scanned. After a final start character is scanned, an EOMD (end of message) signal prevents CA pulses from flowing through a gate 320 to the counter 150 and thus effectively locks into the counter 150 a count value approximately equal to the time it took to scan the final start character. A compare 152 then compares the count value stored within the counter 150 to the increasing count value presented by the counter 114 as the space following the last or stop character is scanned. If the space is sufficiently wide, the two count values ultimately become equal and cause the compare 152 to generate a MATCH signal. The MATCH signal and the EOMD signal then cause the gate 324 to generate a GDRD (good read) signal which signifies a successful scan. However, if the space following the last or stop character is too short, then the MATCH signal and the GDRD signal are not generated.

Figure 4:
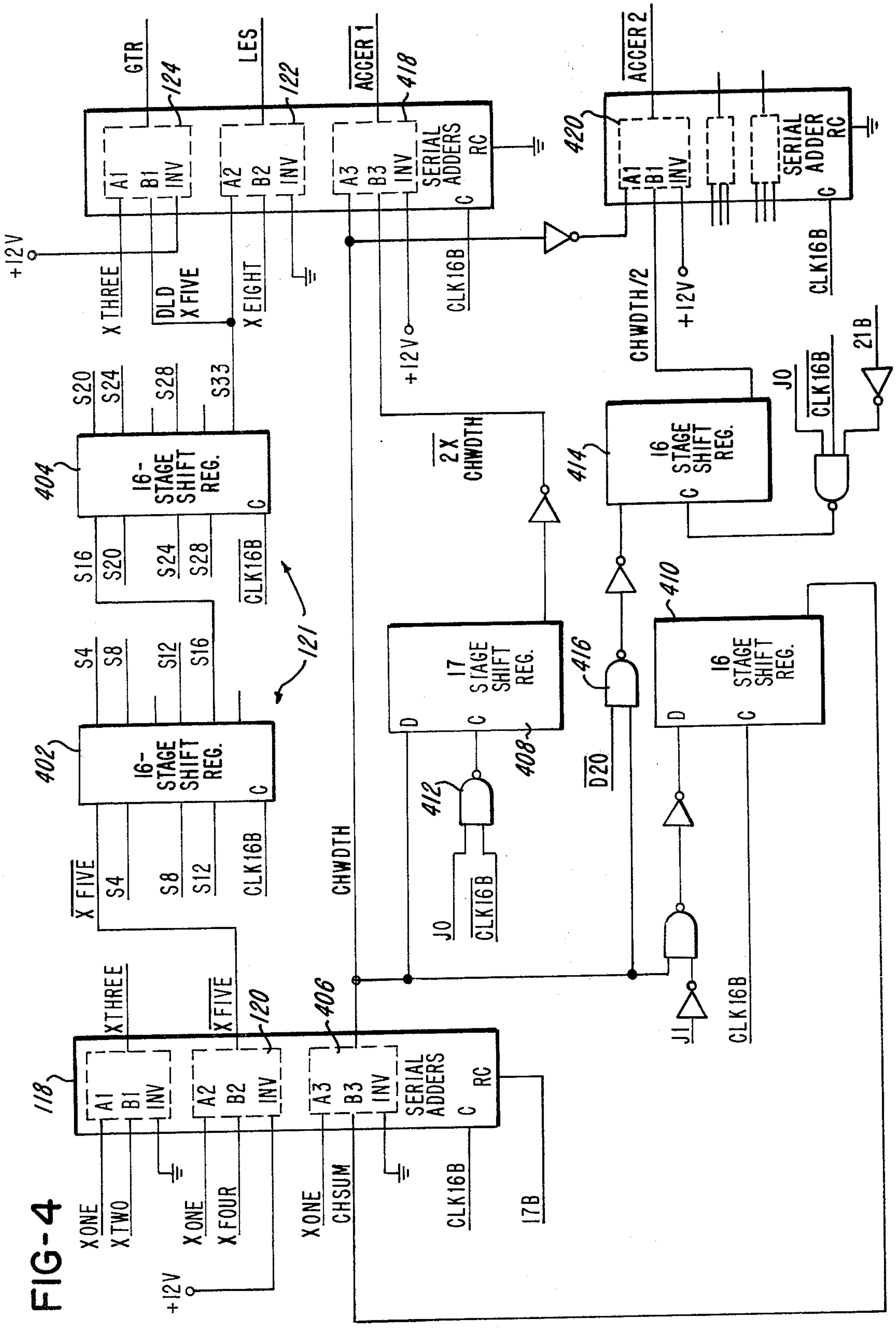
FIG. 4 is a logic diagram of the bar and space width-comparing adders 118, 120, 122, and 124, the shift register 121, and the scanning-rate-change detection logic.

FIG. 4 is a logic diagram of the arithmetic logic which accepts the output signals from the shift register 116 and which carries out the various width comparison operations described above. The XONE and XTWO output signals of the shift register 116 are fed into a serial arithmetic unit 118 which generates the XTHREE output signal. The signals XONE and XFOUR are fed into an arithmetic unit 120 which generates the XFIVE signal. The XFIVE signal is then fed through the shift register 121 which comprises serially-connected first and second 16-bit stages 402 and 404 and which is driven by sixteen CLK16B pulses. The arithmetic units 118 and 120 are also actuated by sixteen CLK16B pulses during each computation. The delayed XFIVE signal from shift register 121 is fed into the arithmetic units 122 and 124 along with the XTHREE signal from the arithmetic unit 118 and the XEIGHT signal from the shift register 116. The arithmetic units 118, 120, 122, and 124 are programmed to cause the units 122 and 124 to compute the difference between the 122- and 124-unit input signals and to generate output signals GTR and LES representing the desired comparison result. After a typical computation, the outputs of the arithmetic units 122 and 124 present a low level signal to represent a positive or zero result and a high level signal to represent a negative result. In either case, the arithmetic unit output signal represents the most significant bit of the result. This bit is always at a high level when the result is a negative number, because negative results naturally appear in complement form. This bit is always at a low level when the result is a positive number, because the most significant bit of a positive number is always a zero bit unless the number is too large to be handled properly. The arithmetic units 122 and 124 are actuated by sixteen CB pulses presented by the CLK16B signal line.

The logic shown in the lower half of FIG. 4 detect sudden changes in the rate of scan and aborts a scan when any such change is detected.

An adder 406 and a shift register 410 sum up the widths of the bars and spaces in each character. The resultant sum CHWDTH (character width) appears at the output of the adder 406 during the start of the intercharacter time interval J0 and is loaded into the two shift registers 408 and 414 at that time. This sum is a measure of the time which it took to scan the complete character. The shift register 410 is cleared during the J1 time interval which follows, and then the adder 406 and shift register 410 commence to measure the time it takes to scan the next character in the same manner.

After the next character has been scanned, a number proportional to the time required to scan that character appears at the output of the adder 406. A pair of adders 418 and 420 compute the difference between this number and the numbers representing the time required to scan the previously scanned character multiplied by two and divided by two. The shift register 408 includes an extra 17th stage which effectively multiplies its contents by two. The shift register 414 receives an extra data advance pulse in the form of a 21B timing pulse, and this extra pulse effectively divides the shift register contents by two. A D20 timing signal disables a gate 416 when the 21B pulse occurs and forces the values zero to be loaded into the shift register at that time.

The adder 418 generates an inverted ACCER1 signal if the current character scan takes more than twice as long as the previous scan. The adder 420 generates an inverted ACCER2 signal if the current character scan takes less than half as long as the previous character scan. Either of these signals may cause the control logic to abort a scan, as is explained more fully below.

FIG. 5 depicts the two shift registers 126 and 128, the read only memory 130, the latches 132 and 134, and the second read only memory 138. The signals GTR and LES which represent the width comparison result are fed into the inputs of the shift registers 126 and 128, each of which comprise a 4-bit shift register having a flip-flop added on as an extra shift-register stage. Data bits are loaded into the shift register 126 and 128 by the trailing edge of the LD16B signal generated by the flip-flop 262 (FIG. 2). This trailing edge occurs immediately following the generation of the sixteen clock pulses from the arithmetic subsystem. Hence, the shift registers 126 and 128 are loaded with the last 2 bits which are presented by the two arithmetic units 122 and 124. As has been explained, alternate outputs of the two shift registers 126 and 128 are fed into inputs of the read only memory 130 along with the BLK signal generated by the digital input circuit and indicative of whether a bar or a space has just been scanned. The read only memory 130 has eight output terminals four of which are fed into the bar latch 132, three of which are fed into the space latch 134, and one of which is not used. The latches 132 and 134 are loaded in synchronism with the timing signal 19B. When the signal 19B occurs, the read only memory 130 is presenting at its output data addressed by the shift registers 126 and 128. The latch 132 is actuated by a 19B pulse only when the BLK signal is present. The 19B pulse is enabled to pass through a gate 136 to strobe the latch 132 by the inverted BLK signal which enables the gate 136 to pass the 19B pulse. When the BLK signal is absent, its absence enables a 19B pulse to pass through an alternate gate 138 and to strobe data into the space latch 134. In this manner, the bar latch 132 is loaded with data from the read only memory 130 after each bar code is scanned and the space latch 134 is loaded with data from the read only memory 130 after each space code is scanned. The read only memory 130 has stored within each of its addressable locations data which corresponds precisely to the wide and narrow width patterns of the bars or spaces that have most recently been scanned.

The data captured by the latches 132 and 134 is presented as the data output of the system. This data may or may not be meaningful depending upon the status of the counter 142. When the count J0 terminates, the captured data actually represents the width of the bar and space elements for a character, assuming that characters are being scanned and that the counter 142 is running. The signal J0 may be fed to the external data utilization device to signal when the captured data is to be sampled.

The read only memory 138 is enabled to function only when the signal J0 is present. When so enabled, the read only memory 138 accepts as an address code the data captured by the two latches 132 and 134. The read only memory 138 then presents the content of a memory location which indicate the nature of the "character" that has just been scanned. The output of the read only memory 138 is a plurality of control signals 144 which identify start and stop characters and which single out characters containing parity and other errors.

It is anticipated that the preferred embodiment of the present invention will be used in at least two different applications involving two differing coding schemes. A first coding scheme is primarily intended for use in retail applications, such as in grocery and department stores, and a second coding scheme is primarily intended for use in warehouses, parcel address scanning, and in other such applications. The read only memory 138 is designed to generate control signals for either of these two applications and is thus suitable for use with either coding scheme.

The control signal STF-RU signals the forward reading of any bar-code start character. The control signal STB-RU signals the backward reading of any bar-code start character. If a start character is a retail-code start-character, then a control signal STF+STB—R signal appears. The signal STF+STB—R does not appear if the start character is a non-retail-code start character. In response to any start code of any kind, whether read forward or backward, an STF+STB—RU signal is generated.

The remaining two control signals indicate errors. If an error is encountered in a retail code character, a CATER RET signal appears. If an error is encountered in a character coded using the other type of code, a CATER UPC signal appears. Naturally, the read only memory 138 does not know which type of code is currently being used. The memory generates the control signals in accordance with how it interprets each character. Other logic elements within the system control logic (FIG. 6) determine exactly what actions take place in response to the various combinations of control signals which can occur.

Figure 6:
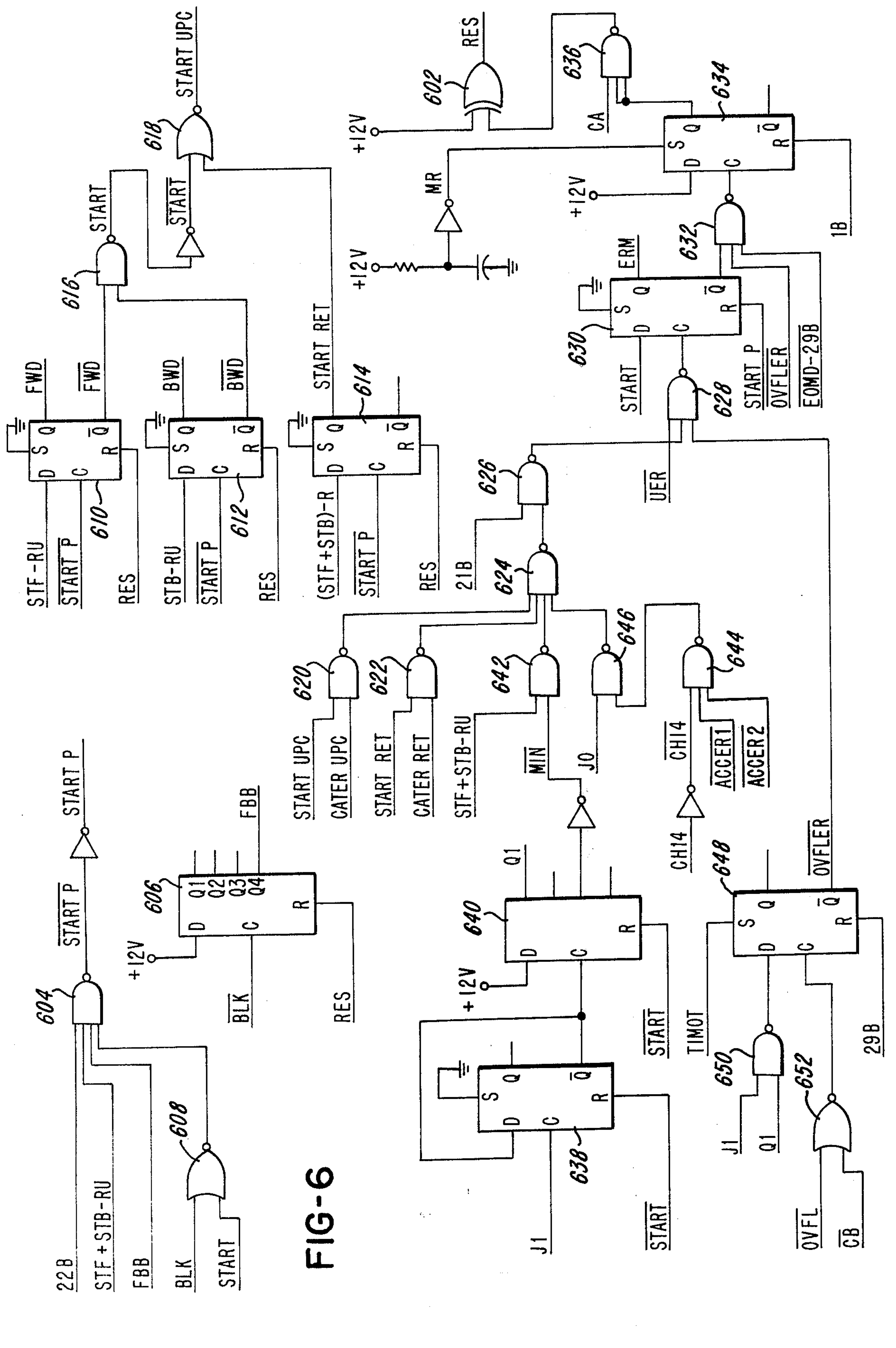
FIG. 6 is a logic diagram of the control logic 140, excepting elements of the control logic 140 which appear at the bottom of FIG. 3.

FIG. 6 and the bottom portion of FIG. 3 illustrates the details of the control logic 140 which controls the overall operation of the system 100. This control logic is described in the paragraphs which follow.

After any scanning operation is completed, the entire system is reset by a signal RES (system reset) that is generated by a gate 602 (FIG. 6 — far right-hand edge). This signal resets all of the system counters and control circuits, and in particular it resets the flip-flops shown in the upper portion of FIG. 6. This terminates the flow of the START signal from a gate 616 that connects to the inverted outputs of the flip-flops 610 and 612. The system now enters a search mode of operation during which it searches for a valid start character.

The counter 142 (FIGS. 1 and 2) is initially locked in a reset state by the absent START signal at its reset input, and the counter 142 continuously generates its JO output signal. Since this JO output signal is continually present, it forces the read only memory 138 to continuously scan the captured data presented by the latches 132 and 134. When the latches capture data corresponding to a start code, the read only memory 138 generates the signal STF+STB—RU and supplies this signal to a gate 604 in the upper left-hand corner of FIG. 6. The gate 604 is disabled prior to the scanning of a fourth black bar after a system reset by an FBB signal which is generated by a simple shift register 606. In addition, the gate 604 is prevented from responding after the scanning of a space by the BLK signal which is fed to the gate 604 through a gate 608. The gate 604 is strobed periodically by a timing signal 22B which comes from the timing signal counter. The output of the gate 604 is the START P (start pulse) signal pulse. In brief summary, a START P pulse is generated when a valid start code combination is encountered which includes four bars and the three intervening spaces all of which have been scanned since the occurrence of the RES (system reset) signal.

The trailing edge of the START P pulse is applied to the clock inputs of the flip-flops 610, 612, and 614. If the start character just encountered is a forward start code, then the read only memory 138 generates the STF—RU control signal which enables the flip-flop 610 to commence generating a FWD signal. If the start character just encountered is a backwards start code, then the read only memory 138 generates the STB-RU control signal which enables the flip-flop 612 to commence generating the BWD signal. Normally, only one of these two flip-flops will be set. If the start character is a retail code start character, then the read only memory 138 generates the STF+STB—R signal which enables the flip-flop 614 to commence generating a START RET (retail start code) signal.

When either of the flip-flops 610 or 612 is set, its inverted output passes through the gate 616 and becomes the START signal. If the flip-flop 614 is also set, it disables a gate 618 from generating a START UPC signal. The absence of this signal indicates the start character is a retail start character. If the flip-flop 614 is not set, then the gate 618 is not disabled and a START UPC signal is generated to indicate that the start character is not a retail start character.

The functioning of the shift register 606 deserves a brief explanation. It is not desired to place the gate 604 into operation to look for a valid start character until at least four bars have been scanned because prior to the scanning of four black bars the latches 132 and 134 may contain some meaningless data. The four-bit shift register 606 is reset by the signal RES at the start of each scanning session. The D input to this shift register connects to a positive node, and the shift register is strobed each time the BLK signal goes high to indicate that a black bar has just been scanned. The shift register is initially loaded with 0 bits by the RES signal. After four positive fluctuations of the inverted BLK signal, the Q4 output of the shift register 606 goes high and generates an FBB (four black bars) signal which enables the gate 604 to commence looking for a start code.

The START signal generated by the gate 618 is fed back to the counter 142 shown in FIG. 2 to release that counter. The counter 142 then commences counting the bars and spaces in each character. The JO output of the counter 142 now disables the read only memory 138 except after each complete character has just been scanned. In this manner, the read only memory 138 is prevented from interpreting the widths of some bars from a first character and of other bars from a following character as a valid or an invalid character. The system is now functioning in a scan mode during which it examines each successive set of four bars to see if the bars represent a valid character.

The test for valid characters is carried out by a pair of gates 620 and 622 shown in the center of FIG. 6. The gate 620 is enabled by the START UPC signal when a non-retail code is being scanned, and the gate 622 is enabled by the START RET when a retail code is being scanned. The retail error output control signal CATER RET is fed into the gate 622, and the non-retail error output control signal CATER UPC is fed into the gate 620. If a retail code is being scanned and a retail code error occurs, the gate 622 generates an output signal. If a non-retail code is being scanned and a non-retail code error occurs, the gate 620 generates an output signal. Either of these output signals passes through a gate 624 and is strobed through a gate 626 in synchronism with the timing signal counter pulse 21B. The resulting pulse passes through a gate 628 and strobes an error flip-flop 630. The flip-flop 630 then generates the ERM (error in message) signal to tell an external data utilization device that an error has been encountered. The inverted output of the flip-flop 630 passes through a gate 632 and sets a flip-flop 634. An output signal from the flip-flop then enables gate 636 to pass the next CA timing pulse through the gate 602 to the RES signal line to reset the system. The system is thus reset as soon as any error is encountered within a message. The flip-flop 634 is then reset by a 1B timing clock pulse. The system now returns to the search mode of operation described above. The flip-flop 630 remains set until another valid start character is encountered, at which time the flip-flop 630 is cleared by the START P pulse.

Assuming that the scanning proceeds in a normal manner without any errors being encountered, the end of the scan is detected by the logic shown in the bottom portion of FIG. 3. When a second start character is encountered in a message, the read only memory 138 again generates an output signal STF+STB—RU. This signal plus the continuing high-level START signal, cause a gate 326 to supply a high level signal to the D input of a flip-flop 328. The flip-flop 328 is then strobed by the next following 22B timing pulse and commences to generate the EOMD (end of message) signal. A gate 330 is enabled by the EOMD signal to pass a single 29B timing pulse to a signal line that is labelled EOMD-29B. This signal pulse is fed through the gate 632 in FIG. 6 to set the flip-flop 634 and to initiate a system reset, as has already been explained.

As the last bar in the last start character is scanned, the absence of the EOMD signal prevents CA clock pulses from flowing through a gate 320 into the counter 150 and initiates the procedure described above during which the width of the space following the final start character is compared to the width of the start character itself. If the space is too narrow, this indicates that another character follows the purported final start character and thus that an error must have occurred. The GDRD signal pulse is not generated in that case. If the space is sufficiently wide, the GDRD pulse is generated. The GDRD pulse sets a flip-flop 332. The inverted output of the flip-flop 332 enables CB clock pulses to pass through a gate 334 and clear the EOMD signal-generating flip-flop 328, thus disabling the gate 324 and terminating the GDRD pulse. The flip-flop 332 remains set until the next valid start character is encountered at which time it is cleared by the START signal. If no GDRD pulse is generated, the flip-flop 332 is set by the next 1B timing pulse which occurs, and its inverted output then permits a CS pulse to clear the flip-flop 328 and terminate the EOMD signal. Hence, an improperly narrow space following a final start character is signalled by the non-occurrence of a GDRD pulse during the brief time when the EOMD signal is present.

At the start of a valid scan, after a first start character has been encountered, it would be improper to encounter a second start character right away. For this reason, the start character control signal STF+STB—RU is initially passed through the gates 646, 624, and 626 to the error-reset logic to trigger a reset whenever a start character of any type is scanned. The absence of any START signal at the D input of the flip-flop 630 disables the error-reset logic before a first start character is encountered. The gate 604 is strobed to initiate the START signal by the timing signal 22B only after the gate 626 is strobed by the timing signal 21B. Hence, the error signal supplied by the gate 642 when a first start code is encountered reaches the flip-flop 630 at a time when the START signal is still absent, and the flip-flop 630 is unable to respond to the error signal.

After a first start code is encountered, the occurrence of a bar pattern resembling a start code causes an error signal to flow through the gates 642, 624, 626, and 628. This error signal sets the flip-flop 630 because the START signal is present. The signal ERM is then generated, and the system resets itself to the scan mode.

The gate 642 is disabled after six characters have been scanned by a signal MIN (minimum number of characters have been scanned) signal. A flip-flop 638 and shift register 640 are initially both cleared. When the scanning of valid characters begins, the Jl signal repeatedly toggles the flip-flop 638. Every other toggle is fed to the shift register 640 as a shift pulse which loads 1 data bits into the shift register from a +12 volt potential source. The sixth such toggle causes a 1 data bit to be applied to the MIN signal line. The gate 642 is thus disabled after the sixth bar-code character has been scanned. 1 data bits continue to flow through the shift register 640, and hence the gate 642 remains disabled for the remainder of the scan. Start characters encountered after the seventh character in a message thus cannot produce an error-reset action. This circuit detects the condition when a stylus is placed down in the middle of an all-zero pattern which sometimes can resemble a series sequential start codes.

The time required to scan the inter-character spaces is measured by the counter 148 which is a simple extension of the counter 114. If an inter-character space scan lasts for more than one-half second or so, a TIMOT signal generated by the counter 148 sets a flip-flop 648 and causes an OVFLER (counter overflow error) signal to initiate an error-reset action. The time required to scan a valid bar or space element is measured by the counter 114. If the scan proceeds too slowly, a gate 146 generates an OVFL signal which flows through a gate 652 and sets the flip-flop 648 and initiates an error-reset action. The OVFL signal is normally prevented from setting the flip-flop 648 during the scanning of inter-character spaces by the Jl signal which is inverted by a gate 650 to disable the flip-flop 648 from responding to the OVFL signal at such times. However, the gate 650 is prevented from passing the Jl signal during the scanning of the space following an initial start character by the absence of an enabling Ql signal at that time. Hence, any initial start character must be positioned close to the next following character. It is thus impossible, for all practical purposes, to scan from a start character into the adjoining empty space without producing an error-reset action.

The counter 150, which measures the width of the space following the last character scanned, is also used to measure the width of each character. If a character is scanned too slowly or contains too many wide segments, the counter 150 generates a signal CH14 which flows through the gates 644, 646, 624, and 626 to initiate an error-reset action. The counter 150 is normally prevented from functioning during the scanning of inter-character spaces by the Jl signal which holds the counter 150 reset. After a final start or stop character is scanned, the Jl terminal is not able to reset the counter 150 because the Johnson counter 142 is locked in the JO state by the absence of an inverted START signal at its reset terminal. The counter 150 is thus permitted to display the width of the last character scanned, as has been explained.

While there has been described a preferred embodiment of the invention, it is to be understood that numerous modifications and changes will occur to those skilled in the art. It is therefore intended by the appended claims to encompass all such changes as come within the true spirit and scope of the invention.

I claim:

1. An apparatus for reading width-modulated bar codes comprising:

means for generating a time-varying signal whose fluctuations correspond to the spatial fluctuations in said bar code;

timing means for generating a signal representation of a number proportional to the amount of time which elapses between successive fluctuations in said signal;

a shift register having an input connected to said signal representation and having a plurality of outputs from successive internal stages;

means for loading a signal representation into said shift register each time there is a fluctuation in said signal;

arithmetic means having inputs connecting to said outputs and having an arithmetic output for generating at said arithmetic output a signal representing the sum of or difference between the signals presented to said inputs;

comparison means having two inputs connecting to two of said outputs and having an output for generating at said output a binary signal whose state indicates which of two inputs is the larger or smaller; and a second shift register connected between one of said outputs and said comparison means.

2. An apparatus for reading width-modulated bar codes comprising:

means for generating a time-varying signal whose fluctuations correspond to the spatial fluctuations in said bar code;

a source of periodic pulses;

a counter having a count input connected to said pulses and having a parallel count signal output;

means for resetting said counter when said signal fluctuates;

a shift register having a parallel signal input connecting to said parallel count signal output and having at least three serial outputs each originating from a different internal stage;

means for loading said shift register from said parallel signal input before said counter is reset;

a serial arithmetic unit having two serial inputs connected to two of said serial shift-register outputs and having a serial output;

a serial comparator having two serial inputs connecting to the serial output of said arithmetic unit and also connecting to the third serial output of said shift register, said comparator having a comparison output; and a second shift register interposed between one of said serial outputs and one of said serial inputs.

3. An apparatus in accordance with claim 2 wherein said second shift register comprises a number of serially-connected stages equal to twice the number of data bits which are used to represent numbers and which therefore may simultaneously store the width of a bar and the width of the immediately following space, or vice versa.

4. An apparatus for decoding width-modulated bar codes comprising:

means for generating a time-varying signal whose fluctuations correspond to the spatial fluctuations in said bar code;

a source of periodic pulses;

a counter having a count input connected to said pulse source and having a parallel count signal output;

a shift register having a parallel signal input connecting to said parallel count signal output and having four serial signal outputs from differing internal stages at which appear serial signals corresponding to the shift-register contents multiplied by one, two, four, and eight respectively, which signals are hereafter referred to as the times one, times two, times four, and times eight signals;

a pair of serial arithmetic units each having two inputs and an output, said first unit receiving the times one and times two signals as input signals and generating a times three output signal, and the second unit receiving as input signals the times one and times four signals and generating a times five output signal;

a second shift register having an input connected to the times five signal and having an output at which a delayed times five signal appears;

a pair of serial input comparators each constructed from a serial arithmetic unit, each having two inputs and an output, said first comparator receiving the times three and the delayed times five signals as inputs and said second comparator receiving the times eight and the delayed times five signals as inputs, said comparators generating at their outputs signals indicating the relative width of successive bar-code elements.

5. An apparatus in accordance with claim 4 wherein said second shift register comprises a plurality of serially-connected stages equal in number to twice the number of bits used to represent a numeric value in serial form, whereby said comparators compare the widths of bars to the widths of bars and compare the widths of spaces to the widths of spaces.

6. An apparatus in accordance with claim 5 which further includes:

third and fourth shift registers having serial inputs connected to the comparator outputs and having a number of stages at least equal to the number of elements in a bar-coded character;

a read-only memory having address signal inputs connecting to alternate stages of said shift registers, and having a data output;

a pair of data latches connecting to the data output of said memory; and means for actuating one of said latches in response to signal fluctuations in a first direction and means for actuating the other of said latches in response to signal fluctuations in the other direction.

7. An apparatus in accordance with claim 6 which further includes:

a second read-only memory having address inputs connecting to said latches and having data outputs;

at least one flip-flop which may be set by an output of said second read-only memory to signal the detection of a start character;

a counter that is normally locked at a certain count value by said flip-flop but that is permitted to count when said flip-flop is set, said counter having a number of stages equal to the number of elements in a bar-coded character, and said counter supplying an enabling signal to said second read-only memory whenever it reaches said certain count value; and at least one additional flip-flop which may be set by an output of said read-only memory to give an error indication but only when said read-only memory receives an enabling signal.

8. An improved width-modulated bar-code scanner designed for scanning bar-code characters which are separated from one another by spaces and which are preceded and followed by control characters, said scanner including mechanisms for rejecting scans which proceed too slowly, wherein the improvement comprises:

means for rejecting an otherwise valid initial control character which is followed by a wide space;

means for rejecting an otherwise valid scan if more than a predetermined maximum amount amount of time is spent scanning any given space;

means for rejecting an otherwise valid scan when a final control character is detected within a predetermined number of characters of an initial control character; and means for comparing the width of a final control character to the width of the space following that final control character, and means for rejecting an otherwise valid scan if the ratio of the space width to the final control character width is less than a predetermined value.

9. In an apparatus for reading width-modulated bar codes having means for measuring and comparing the relative widths of code elements, means for detecting a start code combination of code elements, and means for interpreting groups of code elements as encoded character representations, said character representations being separated from one another by spaces, the improvement comprising:

means for rejecting an otherwise valid start code combination which is followed by a wide space; said means including a counter that counts during the scanning of any code element, means responsive to a particular count value being reached by said counter for giving off an "underspeed scan" error indication; means for normally suppressing said error indication at times when the spaces between adjoining character representations are scanned; and means for defeating said suppressing means when the space following a start code combination is scanned, thereby permitting said error indication to be generated.

10. An apparatus in accordance with claim 9 including means responsive to a second, higher count value having been reached by said counter for giving off an "excessively wide space" error indication.

11. In an apparatus for reading width-modulated bar codes having means for measuring and comparing the relative widths of code elements comprising said code, and means for interpreting groups of such elements as encoded character representations, said character representations being separated from one another by spaces, the improvement comprising:

means for rejecting an otherwise valid bar code if more than a predetermined maximum amount of time is spent scanning any given space separating character representations from one another, said means including a constant-frequency source of pulses, a counter arranged to count said pulses, means for representing the spatial positions of said code elements by fluctuations in a time-varying signal, means for resetting said counter in response to said fluctuations, means for deriving from said counter numbers proportional to the elapsed time between said fluctuations which may be compared to determine the character representations represented by the groups of elements, and means responsive to said counter reaching a predetrmined count value for generating an error indication, said predetermined count value and the frequency of said constant frequency source of pulses being chosen such that said error indication is only generated when said time-varying signal has not fluctuated for a time interval that is substantially longer than the time normally required to scan the widest of code elements.

12. An apparatus in accordance with claim 11 wherein said means for giving off an error indication comprises an apparatus-resetting mechanism having an input connecting to an output of said counter which is actuated by said counter if said counter is not reset for approximately one-half a second, and having outputs extending to all flip-flops within the apparatus which are reset to initialize the operation of the apparatus.

13. In an apparatus for reading width-modulated bar codes having means for measuring and comparing the relative widths of code elements comprising said code, means for detecting a start-code combination of elements, means for interpreting groups of elements as encoded character representations, and means for detecting a stop-code combination of elements which may be identical to said start-code combinations, the improvement comprising:

means for rejecting an otherwise valid scan when a stop-code combination is detected within a predetermined number of encoded character representations following the detection of a start-code combination, said rejecting means including a counting mechanism, means for advancing said counting mechanism each time a predetermined number of elements is scanned, means for preventing said mechanism from advancing prior to the detection of a start-code combination by said start-code detecting means, means for signalling an error condition whenever a stop-code combination is detected by said stop-code detecting means, and means responsive to said counting mechanism reaching a predetermined count for defeating the operation of said signalling means.

14. In an apparatus for reading width-modulated bar codes having means for measuring and comparing the relative widths of code elements, means for detecting a start-code combination of code elements, means for detecting a stop-code combination of code elements which may be identical to the start-code combinations and means for interpreting groups of code elements detected between a start-code combination and a stop-code combination as encoded character representations separated by spaces, the improvement comprising:

means for comparing the width of a stop-code combination to the width of the space following the final stop-code combination and rejecting an otherwise valid scan if the ratio of the width of the following space to the width of the stop-code combination is less than a predetermined value, said comparing and rejecting means including a first counter responsive to code elements for measuring the width of said code elements, a second counter for measuring the width of the encoded character representations, means responsive to the detection of the stop-code combination by said detection means for maintaining the current value of the count within said second counter, comparison means for comparing the contents of said counters, and means responsive to said comparison means for signalling a proper scan only if the count in said first counter reaches a predetermined relative magnitude with respect to the count in said second counter subsequent to the detection of said stop-code combination.

* * * * *

UNITED STATES PATENT AND TRADEMARK OFFICE
CERTIFICATE OF CORRECTION

PATENT NO. : 3,906,203

DATED : September 16, 1975

INVENTOR(S) : Arnis G. Butulis

It is certified that error appears in the above-identified patent and that said Letters Patent are hereby corrected as shown below:

line 35,
Column 1,
change "abovemen-" to --above-men- --; line 67, "piece" has
been misspelled. Column 4, line 23, "the" has been misspelled.
Column 5, line 4, after "pulse" insert --.--;
line 29, change "two" to --three--; line 52
omit paragraph break. Column 6, line 38, change "last" to
--least--. Column 7, line 47, change "sufficiently" to
--sufficient--. Column 8, line 12, "generated" should be
--generate--. Column 10, line 23, "continuous" should be
--continues--. Column 11, line 31, "to" should be --too--.
Column 13, line 21, change "present" to --"present"--; line 22,
change "absent" to --"absent"--; line 27, change "present" to
--"present"--; lines 27 and 28, change "absent" to --"absent"--;
line 57, "generator" should be --generating--. Column 15,
line 3, "computers" should be --counters--; line 34, change
"DO" to --D0--; line 61, "states" should be --stages--.
Column 16, line 59, "processing" should be --progressing--.

Column 17, line 29,change "T+O" to --T+0--; change "T/O" to
--T/0--; line 31, "148" should be --318--. Column 18, line 63,
"values" should be --value--. Column 19, line 12, change
"register" to --registers--; line 61, "content" should be
--contents--. Column 20, line 51, change "JO" to --J0--.
Column 21, line 49, change "JO" to --J0--. Column 22, line 58,
change "CS" to --CB--. Column 23, line 26, change "1" to
--"1"--; line 28, change "1" to --"1"--; line 30, change "1" to
--"1"--. Column 24, line 7, change "JO" to --J0--. Column 26,

Signed and Sealed this

*twenty-second* Day of *June 1976*

[SEAL]

*Attest:*

RUTH C. MASON
*Attesting Officer*

C. MARSHALL DANN
*Commissioner of Patents and Trademarks*